(12) United States Patent
Smith et al.

(10) Patent No.: US 12,538,141 B2
(45) Date of Patent: Jan. 27, 2026

(54) GRANULARITY OF COORDINATION GROUPS (CGs) USING SECTORIZATION

(71) Applicant: Cisco Technology, Inc., San Jose, CA (US)

(72) Inventors: Malcolm Smith, Richardson, TX (US); Brian Hart, Sunnyvale, CA (US)

(73) Assignee: Cisco Technology, Inc.

( * ) Notice: Subject to any disclaimer, the term of this patent is extended or adjusted under 35 U.S.C. 154(b) by 508 days.

(21) Appl. No.: 18/062,102

(22) Filed: Dec. 6, 2022

(65) Prior Publication Data

US 2024/0187876 A1 Jun. 6, 2024

(51) Int. Cl.
*H04W 24/00* (2009.01)
*H04B 17/318* (2015.01)
*H04W 24/02* (2009.01)

(52) U.S. Cl.
CPC .......... *H04W 24/02* (2013.01); *H04B 17/318* (2015.01)

(58) Field of Classification Search
CPC ... H04W 24/08; H04W 64/00; H04W 64/006; H04W 84/18; H04W 4/02; H04W 4/80; H04W 12/12; H04W 72/542; H04W 88/08; H04W 24/10; H04W 4/021; H04W 28/04; H04W 4/023; H04W 92/20; H04W 12/009; H04W 12/08; H04W 12/122; H04W 12/126; H04W 12/63; H04W 12/64; H04W 24/02; H04W 4/025; H04W 4/026; H04W 4/029; H04W 4/40; H04W 4/42; H04W 48/16; H04W 64/003; H04W 88/02; H04W 16/26; H04W 24/04; H04W 28/06; H04W 52/0206; H04W 52/0216; H04W 52/0235; H04W 52/0245; H04W 52/0248; H04W 56/00; H04W 76/15; H04W 8/005
See application file for complete search history.

(56) References Cited

U.S. PATENT DOCUMENTS

| | | | |
|---|---|---|---|
| 2008/0239938 A1 | 10/2008 | Jalloul et al. | |
| 2009/0180578 A1* | 7/2009 | Chang | H03G 3/3052 |
| | | | 375/345 |
| 2012/0040696 A1* | 2/2012 | Siomina | G01S 5/0268 |
| | | | 455/456.6 |
| 2014/0177605 A1 | 6/2014 | Kwon et al. | |
| 2014/0348015 A1* | 11/2014 | Seo | H04W 24/10 |
| | | | 370/252 |
| 2014/0369336 A1* | 12/2014 | Prakash | H04W 16/18 |
| | | | 370/338 |
| 2015/0257117 A1 | 9/2015 | Diener et al. | |
| 2016/0165630 A1 | 6/2016 | Oteri et al. | |
| 2018/0084472 A1 | 3/2018 | Gariou et al. | |

(Continued)

OTHER PUBLICATIONS

International Search Report and Written Opinion for International Application No. PCT/US2023/082662, mailed Mar. 22, 2024, 16 Pages.

*Primary Examiner* — Quan M Hua
(74) *Attorney, Agent, or Firm* — Merchant & Gould P.C.

(57) ABSTRACT

Improved granularity of Coordination Groups (CGs) using sectorization may be provided. A plurality of sectors around a plurality of Access Points (APs) may be determined. Then, for each of the plurality of APs, it may be determined which sector client devices associated with each of the plurality of APs are in. Next, each of the plurality of APs may be caused to transmit to client devices in a first one of the plurality of sectors.

17 Claims, 3 Drawing Sheets

(56) References Cited

U.S. PATENT DOCUMENTS

| | | |
|---|---|---|
| 2020/0196319 A1* | 6/2020 | Ram .................. H04L 25/0202 |
| 2020/0389853 A1 | 12/2020 | Desai et al. |
| 2020/0404549 A1 | 12/2020 | Verma et al. |
| 2021/0075566 A1 | 3/2021 | Guo |
| 2021/0136679 A1 | 5/2021 | Verma et al. |
| 2021/0409075 A1 | 12/2021 | Yang et al. |

* cited by examiner

GRANULARITY OF COORDINATION GROUPS (CGs) USING SECTORIZATION

TECHNICAL FIELD

The present disclosure relates generally to improved granularity of Coordination Groups (CGs) using sectorization.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
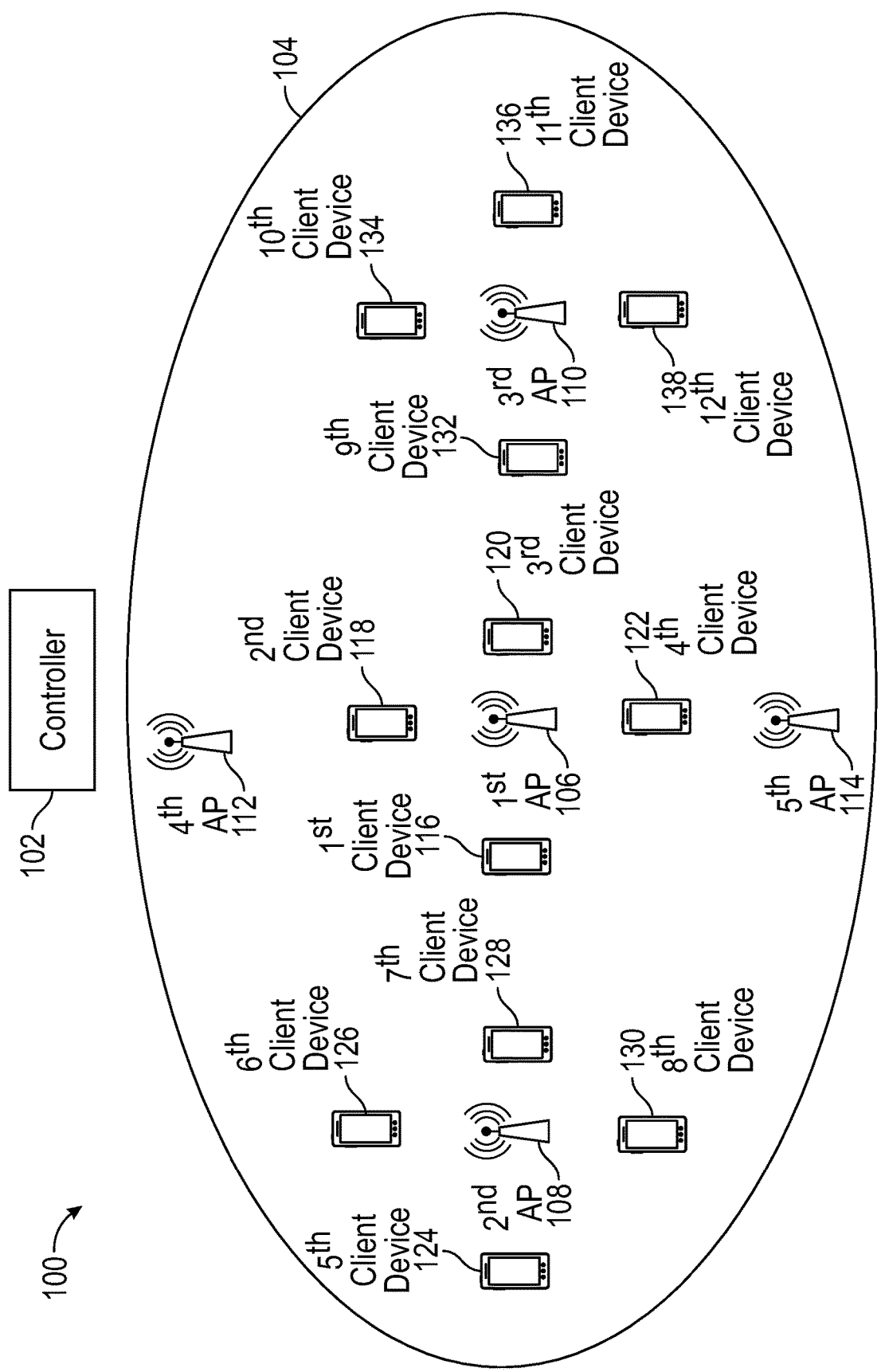
FIG. 1 is a block diagram of an operating environment for providing improved granularity of Coordination Groups (CGs) using sectorization.

Improved granularity of Coordination Groups (CGs) using sectorization may be provided. A plurality of sectors around a plurality of Access Points (APs) may be determined. Then, for each of the plurality of APs, it may be determined which sector client devices associated with each of the plurality of APs are in. Next, each of the plurality of APs may be caused to transmit to client devices in a first one of the plurality of sectors.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Greater spatial reuse efficiency may be possible by exploiting the position of a client device (e.g., a Station (STA)) with respect to its associated AP. For example, it may be possible for all APs to transmit to their nearest client devices at the same time with acceptable Signal-to-Interference Ratio (SIR). Also, it may be possible for all APs to transmit to all northern client devices at the same time with acceptable SIR. Similarly, it may be possible for all APs to transmit to all western client devices at the same time with acceptable SIR and so forth. However, because the APs use a single Basic Service Set Identifier (BSSID) for all of their associated client devices wherever they are, it may not be trivial to determine which client devices belong in which sector.

FIG. 1 shows an operating environment 100 for providing improved granularity of coordination groups using sectorization. As shown in FIG. 1, operating environment 100 may comprise a controller 102 and a coverage environment 104. Coverage environment 104 may comprise, but is not limited to, a Wireless Local Area Network (WLAN) comprising a plurality of Access Points (APs) that may provide wireless network access (e.g., access to the WLAN for client devices). The plurality of APs may comprise a first AP 106, a second AP 108, a third AP 110, a fourth AP 112, and a fifth AP 114. The plurality of APs may provide wireless network access to a plurality of client devices as they move within coverage environment 104. The plurality of client devices may comprise, but are not limited to, a first client device 116, a second client device 118, a third client device 120, a fourth client device 122, a fifth client device 124, a sixth client device 126, a seventh client device 128, an eighth client device 130, a ninth client device 132, a tenth client device 134, an eleventh client device 136, and a twelfth client device 138. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11ax specification standard for example.

Controller 102 may comprise a Wireless Local Area Network controller (WLC) and may provision and control coverage environment 104 (e.g., a WLAN). Controller 102 may allow the plurality of client devices to join coverage environment 104. In some embodiments of the disclosure, controller 102 may be implemented by a Digital Network Architecture Center (DNAC) controller (i.e., a Software-Defined Network (SDN) controller) that may configure information for coverage environment 104 in order to provide improved granularity of CGs using sectorization.

The elements described above of operating environment 100 (e.g., controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
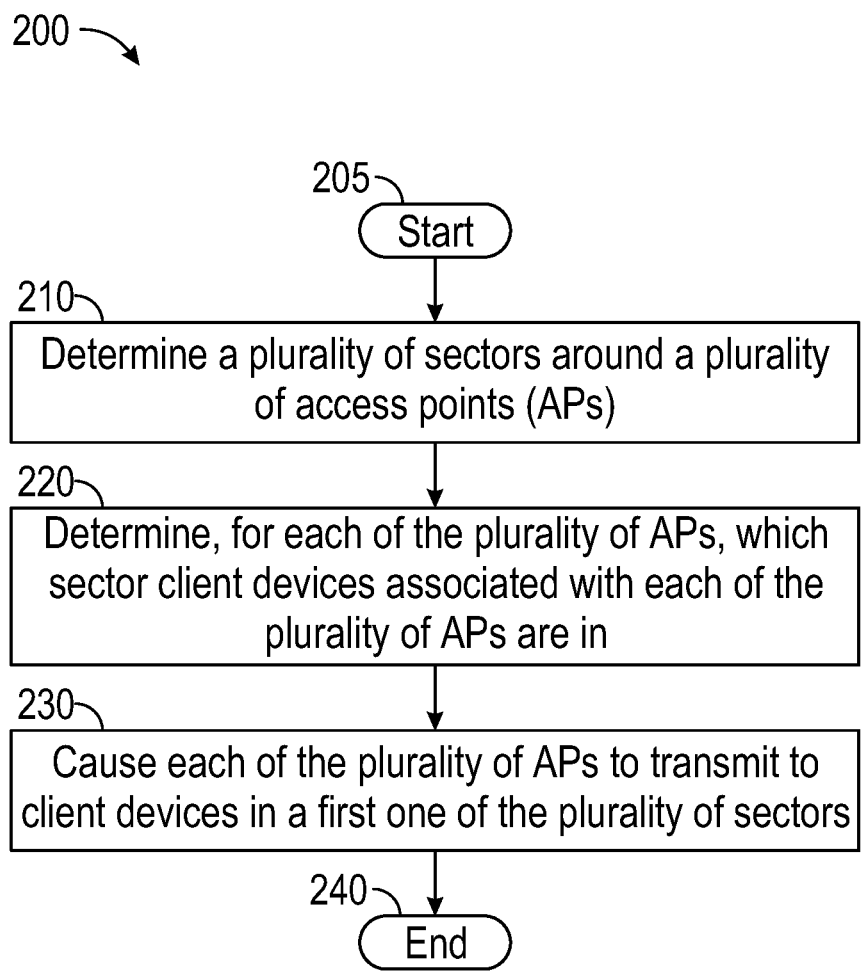
FIG. 2 is a flow chart of a method for providing improved granularity of CGs using sectorization.

FIG. 2 is a flow chart setting forth the general stages involved in a method 200 consistent with embodiments of the disclosure for providing improved granularity of CGs using sectorization. Method 200 may be implemented using controller 102 in conjunction with the plurality of APs as described in more detail above with respect to FIG. 1. Ways to implement the stages of method 200 will be described in greater detail below.

Method 200 may begin at starting block 205 and proceed to stage 210 where controller 102 may determine a plurality of sectors around the plurality of APs. For example, in the example shown in FIG. 2, there may be four sectors around each of the plurality of APs. These four sectors may comprise a north sector, a south sector, an east sector, and a west sector around each of the plurality of APs. While this example includes four sectors, embodiments of the disclosure are not limited to four sectors and include any number of sectors.

From stage 210, where controller 102 determines the plurality of sectors around the plurality of APs, method 200 may advance to stage 220 where controller 102 may determine, for each of the plurality of APs, which sector client devices associated with each of the plurality of APs are in. For example, a definition of sectors may be directly related to improving spatial reuse, may be resilient to heavy walls, may be defined if there are a small number of client devices (e.g., 1) or a larger number of client devices (e.g., 100) clients, may be defined however evenly or unevenly the plurality of APs are located, and works even for APs on the edge or corner of a deployment.

Rather than this strictly being quadrants, sectors may comprise client device partitions where each client device may be in one of the following categories. For example, a first category may comprise client device not being part of any other part (e.g., newly arrived clients without enough data, or badly roaming/scanning clients that may distort the sector too much).

A second category may comprise client devices close to the associated AP. For example, the space close to each of the plurality of APs may comprise a space in which an Received Signal Strength Indicator (RSSI) for each associated client device at an associated AP minus a maximum RSSI for the associated client device at others of the plurality of APs is greater than a predetermined value (e.g., 25 dB). This may be illustrated in the below equation.

$$\text{RSSI\_atAssocAP} - \max(\text{RSSI\_atOtherAP}) > \text{a predetermined value}$$

A third category may comprise client devices in an area around an associated AP (e.g., sector X). For example, determining which sector client devices associated with each of the plurality of APs are in may comprise, for each of the plurality of APs and for each client device associated with each of the plurality of APs, determining that an RSSI for each of the associated client devices at an associated AP minus a maximum RSSI for each of the associated client devices at others of the plurality of APs is less than or equal to a predetermined value (e.g., 25 dB). Furthermore, determining which sector client devices associated with each of the plurality of APs are in may further comprise determining that an RSSI of for each of the associated client devices at an AP designated as being representative of a sector is greatest of RSSIs of for each of the associated client devices at others of the plurality of APs exclusive of the associated AP. This may be illustrated in the below equation.

$$\text{If RSSI\_atAssocAP} - \max(\text{RSSI\_atOtherAP}) <= \text{a predetermined value and RSSI\_atOtherAP}[X] \text{ is strongest among RSSI\_atOtherAP, then client is in sector } X.$$

RSSI_atOtherAP[X] may comprise the RSSI of the client device at the AP designated as being the representative of that sector (i.e., the closest AP that is directly north, south, east, or west of the AP of interest (i.e., associated AP)). Thus to identify a client device as being part of sector X, it's RSSI (RSSI_atOtherAP[X]) may be higher than that to any other AP (RSSI_atOtherAP) excluding the associated AP. The otherAP and otherAP[X] that represent sector X may be determined by using Radio Resource Management (RRM) because that is known during AP deployment.

For example, as shown in FIG. 1, the sectors may comprise north, south, east, and west. First client device 116, second client device 118, third client device 120, and fourth client device 122 may be associated with first AP 106. First client device 116 may be in the west sector, second client device 118 may be in the north sector, third client device 120 may be in the east sector, and fourth client device 122 may be in the south sector. Fifth client device 124, sixth client device 126, seventh client device 128, and eighth client device 130 may be associated with second AP 108. Fifth client device 124 may be in the west sector, sixth client device 126 may be in the north sector, seventh client device 128 may be in the east sector, and eighth client device 130 may be in the south sector. Ninth client device 132, tenth client device 134, eleventh client device 136, and twelfth client device 138 may be associated with third AP 110. Ninth client device 132 may be in the west sector, tenth client device 134 may be in the north sector, eleventh client device 136 may be in the east sector, and twelfth client device 138 may be in the south sector.

With respect to designating an AP as being representative of a quadrant, because second AP 108 may be closest to first client device 116 (excluding first AP 106), second AP 108 may designate as being the representative of the east sector for first AP 106. Similarly, because fourth AP 112 may be closest to second client device 118 (excluding first AP 106), fourth AP 112 may designate as being the representative of the north sector for first AP 106. Furthermore, because third AP 110 may be closest to third client device 120 (excluding first AP 106), third AP 110 may designate as being the representative of the east sector for first AP 106. Because fifth AP 114 may be closest to fourth client device 122 (excluding first AP 106), fifth AP 114 may designate as being the representative of the south sector for first AP 106.

Due to multi-story deployments, irregular propagation, badly-roaming clients, etc, there may be many nearby APs, AP[X], where RSSI_atOtherAP[X] is strongest. The best mitigation for this may be to limit the selection of nearby APs to say the four APs with the strongest AP-to-AP RSSIs.

From the above, RSSI may be an important input, both at the associated AP and at nearby APs. In obtaining RSSI, there may be two challenges: i) Due to rate adaptation, it may be difficult for an Overlapping Basic Service Set (OBSS) AP to successfully receive an Uplink (UL) Physical Layer Protocol Data Unit (PPDU) and obtain the Transmitter Address (TA); and ii) In Basic Service Sets (BSSs) with a large number (e.g., hundreds) of client devices, it may be inefficient to obtain an RSSI from one client device at a time.

With respect to the aforementioned first challenge, APs may report RSSIs of PPDUs with some transmitter identification (i.e., TA). For example, a BSSID from a Media Access Control (MAC) header may be used if a MAC Protocol Data Unit (MPDU) is decoded. In other examples, the TA may be inferred from Short Interframe Space (SIFS)-separated transmissions in a Transmit Opportunity (TXOP) (e.g., Clear To Send (CTS) has Receiver Address (RA) only, but comes SIFS after Request To Send (RTS), which has Transmit (TX) and RA). In yet another example, a Block Acknowledgement Request (BAR) may be sent to solicit a Block Acknowledgement (BA) because the BA includes the TA. In other example, timestamps, with respect to a timebase that may be common across the plurality of APs (i.e., AP synchronization), even when an AP is unable to recover any MPDUs correctly. With this example, a (RSSIs, timestamps, MAC addresses if available)-tuple may be forwarded to a centralized engine (e.g., controller 102). If two APs are nearby and hear a new PPDU at much the same time and one AP obtained a TA (e.g., the AP to which the client device is associated), then time may be used to associate other RSSIs with the TA.

With respect to the aforementioned second challenge, an associated AP may trigger Single User (SU) PPDUs of a random (or troubling) selection of client devices to try to tease out the range of UL RSSIs. In another example, an associated AP may trigger UL Orthogonal Frequency-Division Multiple Access (OFDMA) PPDUs of multiple clients so that multiple RSSIs may be obtainable with much lower overheads. Because the third party AP has no knowledge of what Resource Units (RUs) were triggered, the associated AP may send an AP-to-AP message reporting the RU allocations, or an index to one of a few (or just 1) pre-defined RU plans, far enough beforehand that the third party AP may configure its PHY in time. or In another example, because the third party AP may have no knowledge of what RUs were triggered, the third party AP may assume a very fine grained RU allocation (e.g., all RU26s, or all RU52s where permitted else RU26; or all RU106s where permitted else RU26), calculate one RSSI per assumed RU, and then forward the timestamp and all assumed RU RSSIs to the centralized engine (e.g., controller 102). The associated AP may also forward the actual RU allocation to the centralized engine. If two APs are nearby and hear a new PPDU at much the same time and one AP reported the TA and actual RU allocation (i.e., this AP is the one to which the client devices are associated), then the known RU allocation may be applied to convert the assumed RU RSSIs to actually RU RSSIs. For example, if four assumed RU26 RSSIs were available, but the actual RU used was RU106, then the actual RSSI may be 10*log 10(mean(10**(0.1*four assumed RU26 RSSIs in dBm)). This may be associated with the TA of the user in that RU. Some APs may only calculate the assumed RSSIs with a 20 MHz granularity for example. For those APs, trigger OFDMA PPDUs containing RU242 RUs may be used (e.g., 1/2/4/8/16 users per 20/40/80/160/320 MHz PPDU respectively).

In other words, at a third party AP, UL OFDMA PPDUs may be received, an RSSI for each assumed fine-grained RU may be calculated and sent (with a timestamp) to a centralized engine. The central engine may also obtain RU allocations (and actual RSSIs) from the associated AP triggering the UL OFDMA PPDUs, convert the RSSIs for the assumed RUs into a single RSSI per actual RSSI using the known RU allocations from the associated AP (e.g., using time to match them up), so as to obtain UL RSSIs from many (e.g., 2-74) non-AP client devices in parallel as the associated AP and third part AP.

Once controller 102 determines, for each of the plurality of APs, which sector client devices associated with each of the plurality of APs are in in stage 220, method 200 may continue to stage 230 where controller 102 may cause each of the plurality of APs to transmit to client devices in a first one of the plurality of sectors. For example, all of the plurality of APs may transmit to their nearest client devices at the same time with acceptable Signal-to-Interference Ratio (SIR). Then all of the plurality of APs may transmit to all north sector client devices at the same time with acceptable SIR. Then all of the plurality of APs may transmit to all west sector client devices at the same time with acceptable SIR and so forth to the south sector and then to the east sector. Once controller 102 causes each of the plurality of APs to transmit to client devices in a first one of the plurality of sectors in stage 230, method 200 may then end at stage 240.

Figure 3:
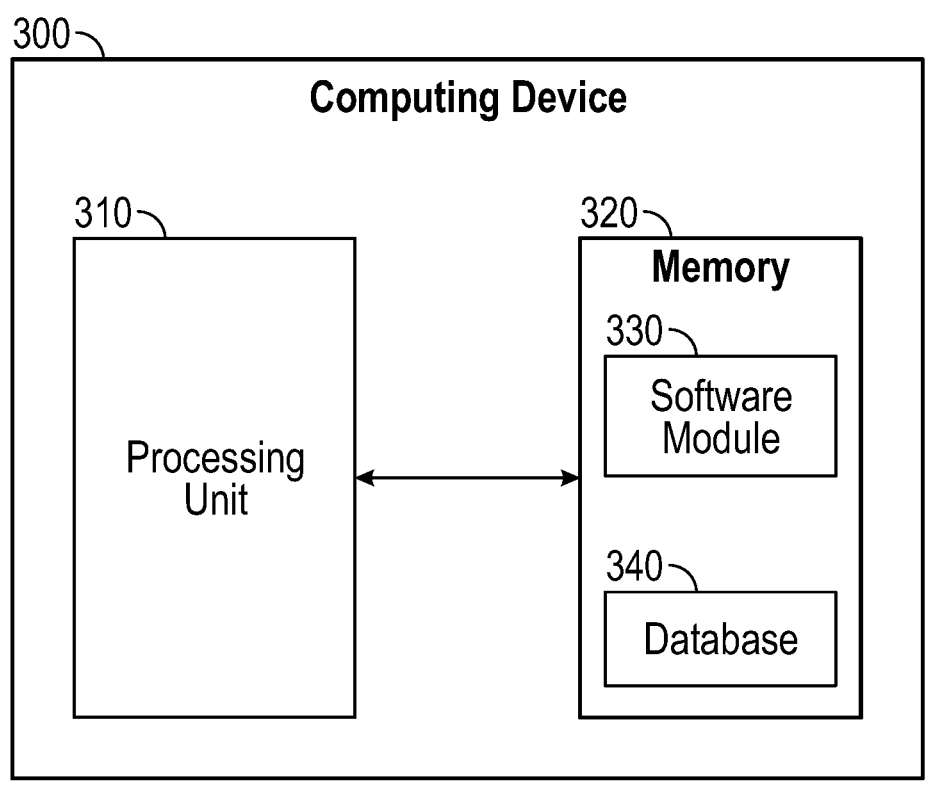
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing improved granularity of CGs using sectorization as described above with respect to FIG. 2. Computing device 300, for example, may provide an operating environment for controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138. Controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining a plurality of sectors around a plurality of Access Points (APs);
    determining, for each of the plurality of APs, which sector client devices associated with each of the plurality of APs are in, wherein determining which sector client devices associated with each of the plurality of APs are in comprises, for each of the plurality of APs and for each client device associated with each of the plurality of APs, determining that an RSSI for each of the associated client devices at an associated AP minus a maximum RSSI for each of the associated client devices at others of the plurality of APs is less than or equal to a predetermined value; and
    causing each of the plurality of APs to transmit to client devices in a first one of the plurality of sectors.

2. The method of claim 1, wherein determining which sector client devices associated with each of the plurality of APs are in further comprises determining that an RSSI of for each of the associated client devices at an AP designated as being representative of a sector is greatest of RSSIs of for each of the associated client devices at others of the plurality of APs exclusive of the associated AP.

3. The method of claim 2, wherein the predetermined value is 25 dB.

4. The method of claim 1, wherein a one of the plurality of sectors comprises a space close to each of the plurality of APs.

5. The method of claim 4, wherein the space close to each of the plurality of APs comprises a space in which an RSSI for each associated client device at an associated AP minus a maximum RSSI for the associated client device at others of the plurality of APs is greater than a predetermined value.

6. The method of claim 5, wherein the predetermined value is 25 dB.

7. The method of claim 1, further comprising causing each of the plurality of APs to transmit to client devices in a second one of the plurality of sectors.

8. A system comprising:
a memory storage; and
a processing unit coupled to the memory storage, wherein the processing unit is operative to:
determine a plurality of sectors around a plurality of Access Points (APs);
determine, for each of the plurality of APs, which sector client devices associated with each of the plurality of APs are in, wherein the processing unit being operative to determine which sector client devices associated with each of the plurality of APs are in comprises, for each of the plurality of APs and for each client device associated with each of the plurality of APs, the processing unit being operative to determine that an RSSI for each of the associated client devices at an associated AP minus a maximum RSSI for each of the associated client devices at others of the plurality of APs is less than or equal to a predetermined value; and
cause each of the plurality of APs to transmit to client devices in a first one of the plurality of sectors.

9. The system of claim 8, wherein the processing unit being operative to determine which sector client devices associated with each of the plurality of APs are in further comprises the processing unit being operative to determine that an RSSI of for each of the associated client devices at an AP designated as being representative of a sector is greatest of RSSIs of for each of the associated client devices at others of the plurality of APs exclusive of the associated AP.

10. The system of claim 8, wherein a one of the plurality of sectors comprises a space close to each of the plurality of APs wherein the space close to each of the plurality of APs comprises a space in which an RSSI for each associated client device at an associated AP minus a maximum RSSI for the associated client device at others of the plurality of APs is greater than a predetermined value.

11. A non-transitory computer-readable medium that stores a set of instructions which when executed perform a method executed by the set of instructions comprising:
determining a plurality of sectors around a plurality of Access Points (APs);
determining, for each of the plurality of APs, which sector client devices associated with each of the plurality of APs are in, wherein determining which sector client devices associated with each of the plurality of APs are in comprises, for each of the plurality of APs and for each client device associated with each of the plurality of APs, determining that an RSSI for each of the associated client devices at an associated AP minus a maximum RSSI for each of the associated client devices at others of the plurality of APs is less than or equal to a predetermined value; and
causing each of the plurality of APs to transmit to client devices in a first one of the plurality of sectors.

12. The non-transitory computer-readable medium of claim 11, wherein determining which sector client devices associated with each of the plurality of APs are in further comprises determining that an RSSI of for each of the associated client devices at an AP designated as being representative of a sector is greatest of RSSIs of for each of the associated client devices at others of the plurality of APs exclusive of the associated AP.

13. The non-transitory computer-readable medium of claim 12, wherein the predetermined value is 25 dB.

14. The non-transitory computer-readable medium of claim 11, wherein a one of the plurality of sectors comprises a space close to each of the plurality of APs.

15. The non-transitory computer-readable medium of claim 14, wherein the space close to each of the plurality of APs comprises a space in which an RSSI for each associated client device at an associated AP minus a maximum RSSI for the associated client device at others of the plurality of APs is greater than a predetermined value.

16. The non-transitory computer-readable medium of claim 15, wherein the predetermined value is 25 dB.

17. The non-transitory computer-readable medium of claim 11, further comprising causing each of the plurality of APs to transmit to client devices in a second one of the plurality of sectors.

* * * * *